Dec. 20, 1955    J. T. KANEMOTO    2,727,609
ELECTRIC TRIP PULL DEVICES FOR FARM MACHINES
Filed Feb. 5, 1952
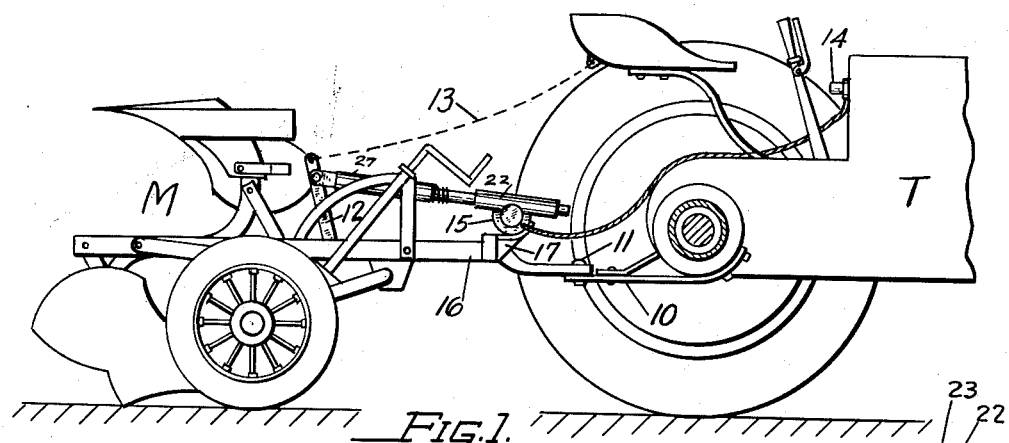
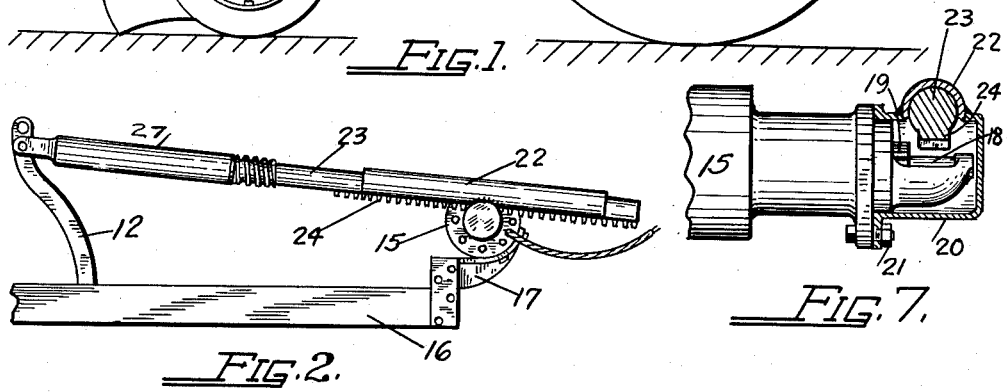
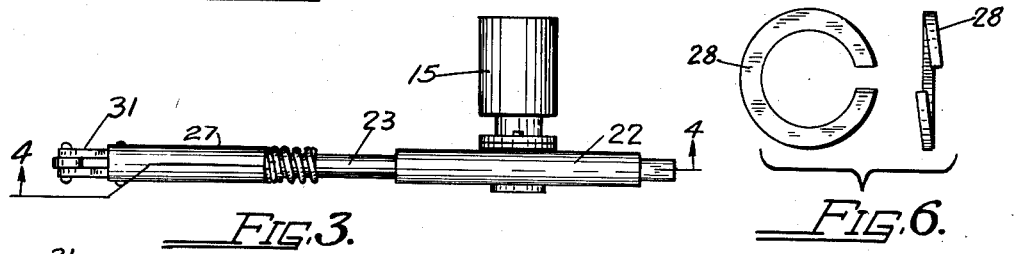
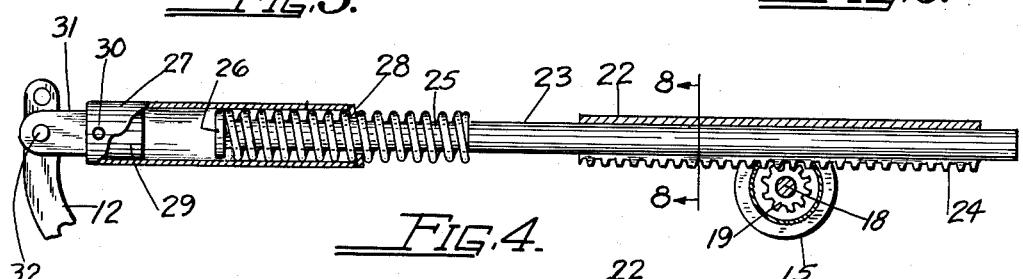
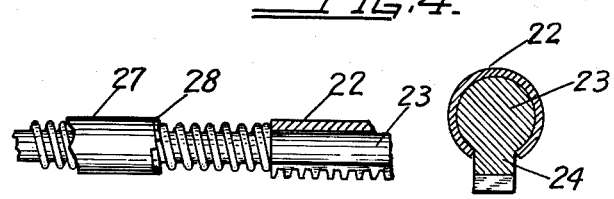
INVENTOR.
JIMMIE T. KANEMOTO
BY
Martin E. Anderson
ATTORNEY

United States Patent Office 2,727,609
Patented Dec. 20, 1955

2,727,609

ELECTRIC TRIP PULL DEVICES FOR FARM MACHINES

Jimmie T. Kanemoto, Longmont, Colo.

Application February 5, 1952, Serial No. 270,077

6 Claims. (Cl. 192—62)

This invention relates to improvements in farm machinery and has reference more particularly to an attachment for use with tractor drawn earth working machines.

This invention, although useful in many other relations, will be illustrated and described in connection with tractor drawn plows.

Practically all earth working machines such as plows and cultivators that are operated at some distance to the rear of tractors are provided with lifting mechanisms that raise the plow or other implement to inoperative position and latch it in that position until the latch is released by the operator who pulls a trigger rope to effect the release. When the implement is to be again raised and latched this is effected by the operator who gives a pull on the trigger rope to set the lifting mechanism in motion.

The two operations, the raising and latching, and the releasing operations are effected by alternate pulls on the trigger rope.

It has been found that simple as these operations are they nevertheless are irksome and tiring because they must be so often repeated, usually at corners and ends of furrows where the operator is busy with controlling the tractor.

Since all tractors are provided with electric generators by means of which motors and other electrical mechanisms may be operated it is the object of this invention to produce electrically controlled means for effecting the operation and release of the tool lifting devices which can be controlled by a switch positioned within convenient reach of the operator.

The automobile industry has provided all cars with electric motor starters. The starter that is almost universally used is referred to by the name "Bendix." Such starters are well known and comprise an electric motor having a pinion connected with the drive shaft by a helical spline or thread which causes the pinion to move along the motor shaft when the motor starts and engage a gear known as a "ring gear." As soon as the engine starts the pinion is moved in the opposite direction by the action of the ring gear.

Since such starting mechanisms are old and well understood they will not be described in any greater detail than necessary for an understanding of the invention to which this application relates and which will now be described for which purpose reference will now be had to the accompanying drawing in which the invention has been illustrated and in which Figure 1 is a side elevational view showing in a general way the manner in which a tractor and ground working machine are connected and showing also the general arrangement of the trip operating device.

Figure 2 is a side elevation of the trip operating mechanism.

Figure 3 is a top plan view thereof.

Figure 4 is a section to a somewhat enlarged scale, taken on line 4—4 Figure 3.

Figure 5 is a fragmentary view, partly in elevation and partly in section, showing one extreme position of the parts.

Figure 6 is a view in side and edge elevation of the helical washer employed to effect a connection with the spring.

Figure 7 is a fragmentary side elevation of the starting motor showing a portion of the assembly in section and Figure 8 is a section taken on line 8—8 Figure 4.

Referring now to the drawing, T represents an ordinary farm tractor and M any ground working machine, which in this case has been shown as a roll over two way plow, and is merely illustrative of this type of machine.

The tractor has an ordinary draw bar 10 to which the machine is attached by means such as a pin 11.

The ground working machine is provided with one of the several tool lifting and latching mechanisms in general use; the particular machine shown is equipped with a McCormick power lift which has a control lever 12 to which a trip rope 13 is connected in the manner shown in Figure 1. One pull on the trip rope sets the lifting device into action and the plow bottoms are quickly raised and latched in raised position. A second pull on the trip rope releases the bottoms which then quickly reach their full plowing depth.

The operation of trip lever 12 by the rope seems simple but it must be done often and usually at the ends of the furrows or at the corners where the operator is fully occupied by controlling the tractor and this makes it difficult.

The present invention is designed to replace the trip rope and it sets the lifting device in motion by merely closing a switch which corresponds to the starting switch of an automobile. The starting switch has been designated by numeral 14 in Figure 1 and may be either a foot operated or a hand operated type.

As above explained the trip operating device is designed to take the place of the trip rope and consists of the following elements.

A starting motor 15, of the kind usually forming part of a "Bendix Starter" is attached to frame member 16 of the machine by some suitable means such as the bracket 17.

Referring now more particularly to Figures 4 and 7: Figure 7 shows a portion only of a starting motor of the type mentioned. Reference number 18 designates the motor shaft and 19 the starter pinion. As above mentioned, pinion 19 is connected with the motor shaft by steep pitch threads and normally occupies the position shown in Figure 7. When the motor is started the pinion, which has some considerable mass will not start rotating at once due to its inertia and will therefore move towards the right when viewed as in Figure 7. A cap 20 is attached to the starter motor by bolt 21 and has a tangential notch in which is positioned a tubular guide 22 which is secured to the cap by welding. Guide 22 has an opening in its undersurface extending the entire length thereof.

Slidable in guide 22 is a rack bar 23 that is provided with a toothed rack 24 that projects below the lower peripheral surface of guide tube 22 to such a distance that the pinion will mesh therewith when it moves towards the right. The motor rotates clockwise when viewed as in Figure 4. A coil spring 25 surrounds one end of bar 23 and abuts the end flange 26 in the manner shown in Figure 4. The end of the spring may be welded to flange 26 is desired.

Enclosing a portion of spring 25 is a tube 27 to the inner end of which a helical washer 28 that extends into the space between adjacent coils of the spring, is attached. When the spring is rotated relative to tube 27 the parts act as a bolt and nut and move longitudinally relative to each other. The outer end of tube 27 is closed by a plug 29 that is held in place by a pin 30. Plug 29 has spaced fingers 31 between which trip lever 12 extends and the parts are secured by pivot pin 32.

Let us now assume that the operator closes switch 14 and starts the motor. Pinion 19 moves to the right (Figure 7) and meshes with the teeth on rack 24 and immediately thereafter rod 23 moves towards the right, compresses that portion of the spring between flange 26 and washer 28 thereby exerting a pull on lever 12 which sets the lifting device into operation. When the switch is opened pinion 18 disengages from the rack and the parts return to the position shown in Figures 2 and 4. That part of the spring to the right of washer 28 acts as a buffer in the manner shown in Figure 5.

What is claimed as new is:

1. A manually controlled device for actuating a clutch mechanism or the like comprising, a frame, a lever movably associated with the frame, a bracket attached to the frame, an electric motor carried by the bracket, a pinion on the motor shaft, a tubular guide element carried by the motor in fixed relation to the pinion, said guide member having a slot in its wall extending throughout its entire length, the slot facing the pinion, a rod slidable in the guide member, the rod having a toothed rack projecting through the slot into operative engagement with the pinion, whereby the rod will move longitudinally in the guide member when the motor is operating, and means for effecting an operative connection between the rod and the lever to move the latter when the rod is moved relative to the guide member.

2. A mechanism in accordance with claim 1 in which the bar has its outer end telescopically connected with a tubular member connected to the lever and in which the bar and tubular member are resiliently interconnected by means of a helical spring.

3. A device in accordance with claim 2 in which a helical spring surrounds that portion of the bar between the slotted guide member and the tubular member to provide a resilient stop.

4. A device in accordance with claim 2 in which means is provided for adjusting the normal relative longitudinal position of the tubular member and the bar.

5. A manually controlled device for actuating a lift mechanism for the frame and ground working tool of a wheeled agricultural machine of the type having a normally inoperative clutch between the frame and a wheel and a tripping lever for said clutch, one pull on which actuates the clutch to raise the frame and ground working tool and latches the same in elevated position and a second pull on which releases the latch, said device comprising a bracket attached to the frame at a point spaced from the tripping lever, an electric motor of the rotary type attached to the bracket, a pinion carried by the motor shaft, a tubular guide element attached to the motor, extending at right angles to the motor shaft, said guide having a longitudinally extending opening on the side facing the pinion, a rod slidable in the guide, said rod having a toothed rack that projects through the opening into position to be operatively engaged by the pinion, a tubular member pivotally attached at one end to the trip lever, the other end telescoping over one end of the rod, a helical spring surrounding that portion of the rod that is positioned in the tubular member, an abutment for the spring on the end of the rod and another abutment at the end of the tubular member.

6. A device in accordance with claim 5 in which the abutment in the end of the tubular member, in addition to the central opening through which the rod extends, is also provided with an opening in that portion outside of the central opening through which a coil of the spring extends forming means for transferring portions of the spring from within the tubular member to and from that portion of the rod between the tubular member and the tubular guide, when the spring is rotated relative to the said abutment.

References Cited in the file of this patent
UNITED STATES PATENTS

| | | |
|---|---|---|
| 877,543 | Beers | Jan. 28, 1908 |
| 1,915,422 | Johnson | June 27, 1933 |
| 2,253,419 | Cunningham | Aug. 19, 1941 |